(12) United States Patent
Edmond et al.

(10) Patent No.: US 8,905,605 B2
(45) Date of Patent: Dec. 9, 2014

(54) INTEGRATED WING LIGHT

(75) Inventors: George Edmond, Yatton (GB); Derek Paul Baron, Bristol (GB); Philip Dickinson, Shipham (GB); Stephen Wyatt, Congresbury (GB)

(73) Assignee: Airbus Operations Limited, Bristol (GB)

( * ) Notice: Subject to any disclaimer, the term of this patent is extended or adjusted under 35 U.S.C. 154(b) by 211 days.

(21) Appl. No.: 13/562,664

(22) Filed: Jul. 31, 2012

(65) Prior Publication Data

US 2013/0051044 A1 Feb. 28, 2013

(30) Foreign Application Priority Data

Aug. 31, 2011 (GB) .................................. 1115025.7

(51) Int. Cl.
*B64D 47/06* (2006.01)
*B60Q 1/32* (2006.01)
(52) U.S. Cl.
CPC ...... *B64D 47/06* (2013.01); *B60Q 1/32* (2013.01); *B64D 2203/00* (2013.01)
USPC ......................................... 362/470; 362/540
(58) Field of Classification Search
CPC ............. B60Q 1/32; B60Q 1/26; B64D 47/02
USPC .................................................... 362/470, 540
See application file for complete search history.

(56) References Cited

U.S. PATENT DOCUMENTS

2002/0196637 A1* 12/2002 Dubin et al. .................. 362/470

FOREIGN PATENT DOCUMENTS

| EP | 2072400 A2 | 6/2009 |
| EP | 2138401 A1 | 12/2009 |
| EP | 2327629 A1 * | 6/2011 |
| GB | 2430244 A | 3/2007 |
| JP | 1-279503 A | 11/1989 |

OTHER PUBLICATIONS

A United Kingdom Search Report, dated Dec. 14, 2011 in GB Application No. 1115025.7.

* cited by examiner

*Primary Examiner* — David V Bruce
(74) *Attorney, Agent, or Firm* — Lowe Hauptman & Ham, LLP

(57) ABSTRACT

The present invention is concerned with a modular lighting system having a casing containing a lamp, as well as its power and control circuits fitted within a wing and a flush fitting glazing unit.

14 Claims, 3 Drawing Sheets

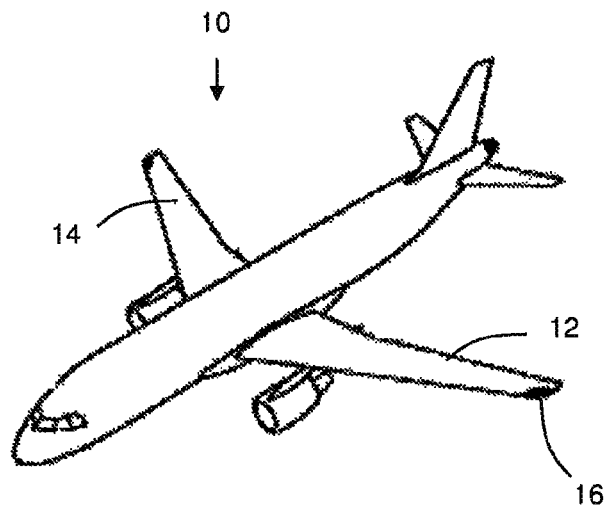
FIG 1 – PRIOR ART
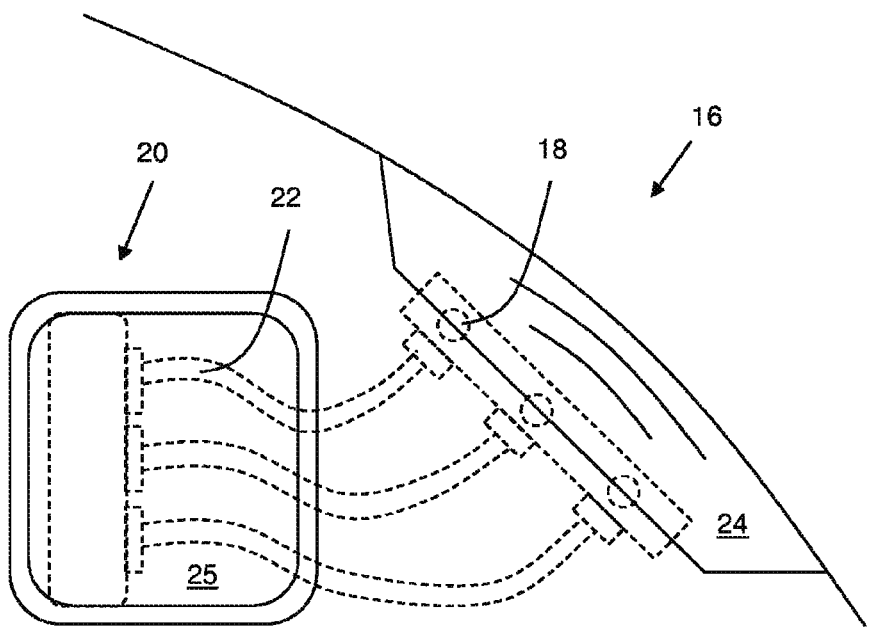
FIG 2 – PRIOR ART

INTEGRATED WING LIGHT

RELATED APPLICATIONS

The present application is based on, and claims priority from, Great Britain Application Number 1115025.7, filed Aug. 31, 2011, the disclosure of which is hereby incorporated by reference herein in its entirety.

The present invention relates to a light for an aircraft wing. More specifically, the present invention relates to a modular, integrated light assembly which is easily replaceable within the aircraft wing or wing tip device.

Lighting systems are known for aircraft wings and may include such lamps as strobes and navigation lights.

Such lighting systems often complex and include power transformers and light control units dispersed throughout a region of the wing or wing tip device, and connected via cabling systems to the lamp which is situated behind a glazing unit proximate the wing leading/trailing edge.

The lamps are often mounted on cylindrical structures projecting from the trailing edge of the wing or wing tip device, and although small, disrupt the airflow thereover, decreasing the aerodynamic efficiency of the aircraft. On the leading edge, the lamp may be integrated within the profile of the wing, and protected by a flush-fit glazing unit. The power and control circuitry is distributed within the wing body and accessible via service panels in the wing skin.

The lamp may be replaced and/or serviced by removal of the glazing unit. The power and control circuitry is accessed via service panels in the wing or wing tip device skin. These can be removed to access the systems below.

A problem with this arrangement is that it is time consuming to service. If the service technician does not know whether the transformer, control unit or lamp is faulty he will have to remove the glazing unit and a number of wing service panels to determine which component requires repair or replacement.

It is an object of the present invention to provide an improved lighting system.

According to the present invention there is provided aircraft wing comprising: a lighting unit module comprising a housing, the housing containing: a lamp, and; an electrical controller, which electrical controller is configured to control illumination of the lamp, the module further comprising a glazing member covering the lamp and having an outer surface which conforms to the profile of the aircraft wing.

Advantageously, a modular lighting unit permits easy removal and replacement. In conjunction with a profiled glazing unit, the system can be easily accessed from the exterior of the wing allowing service and maintenance whilst reducing negative aerodynamic effects seen with traditional lamps.

Preferably the housing contains a power transformer configured to convert the aircraft power supply into a suitable supply for the lamp. For example it may be an AC/DC converter.

Preferably, the glazing member defines a leading or trailing edge of a wing. More preferably, the glazing member defines part of the top and bottom surfaces of the wing. In this way, the glazing unit can be placed at the leading or trailing edge of the wing making it more visible in use.

Preferably, the modular lighting unit is removably mounted in the wing. Preferably this is via a plug or socket connection or, alternatively, via a snap-fit or bayonet fit. Easy removal and replacement reduces the service time for the lighting unit. The technician can simply install a new module without needing to know whether the lamp or control unit is faulty.

Preferably, the housing provides a cylindrical surface engageable with a cylindrical female formation in the wing. As such, manufacture of each individual unit is made more simple and, furthermore, the shape of the unit can be standardised.

Preferably, the housing and female formation comprise complimentary index formations to allow correct alignment of the lamp with the appropriate electrical contacts within the wing.

Preferably, the glazing member is configured to direct light from the lamp parallel to the wing direction of flight via refracting or reflective means such as a prism. This overcomes a problem with flush fitting glazing units where distortion may occur in slim sections of wings such as at the wing tip where the outer surfaces of the glazing are not normal to the direction of flight.

Preferably, a resilient member is disposed between the lamp housing and the wing, more preferably this is an elastomeric sheath which absorbs any shocks between the wing and the light unit and mitigates damage during removal or insertion.

An example lighting unit in accordance with the present invention will now be described with reference to the following figures in which:

FIG. 1 is a perspective view of an aircraft;

FIG. 2 is a plan section view of a prior art lighting system;

Figure 3:
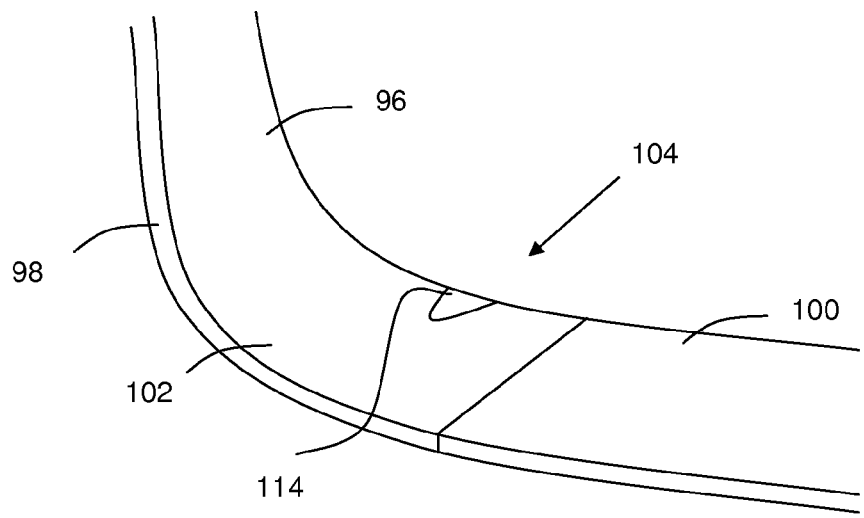
FIG. 3 is a perspective view of a part of an aircraft having a glazing unit in accordance with the present invention.

Referring to FIG. 1, a known aircraft 10 has a port wing 12 and a starboard wing 14. Each of the wings 12, 14 has a glazing unit 16. Referring to FIG. 2, the unit 16 is shown in more detail.

As can be seen, the unit 16 comprises lamps 18 connected to electrical control and power circuitry 20 via a complex set of cables 22 (shown simplified for clarity). A glazing unit 24 is installed over the lamps 18. Access to the lamps if possible via removal of the glazing unit 24, whereas access to the circuitry must be made through skin hatches 25.

Figure 4:
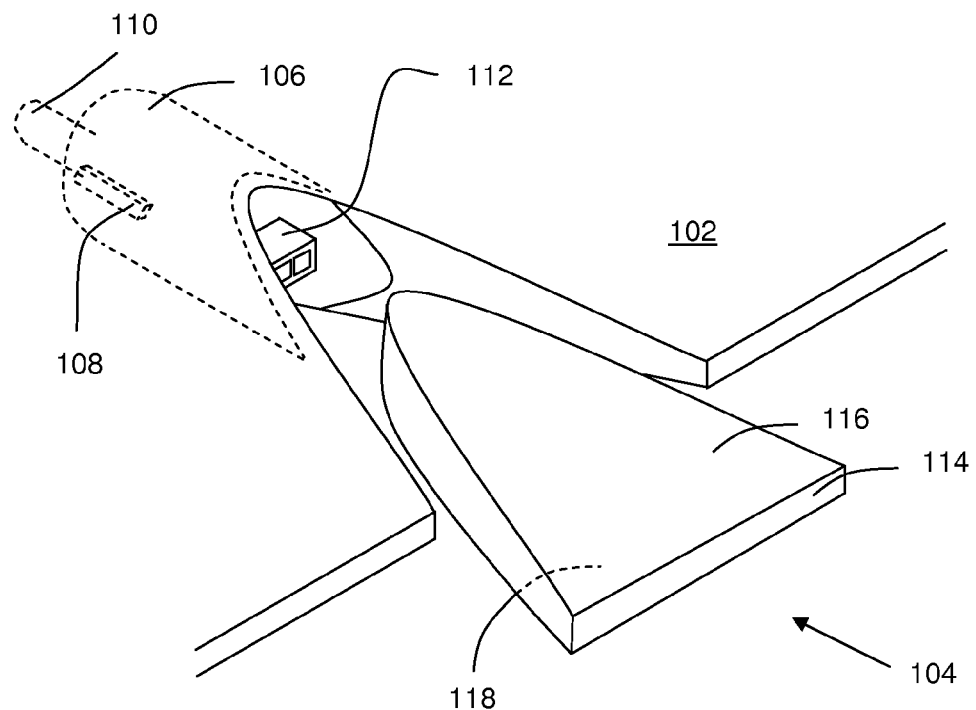
FIG. 4 is a perspective view of a glazing unit in accordance with the present invention; and, FIG. 5 is a side section view of the glazing unit of FIG. 4.

Turning to FIG. 3, part of an aircraft wing 100 is shown having a wing tip device 102 attached to the tip thereof. A lighting unit 104, according to the present invention, is installed as shown in more detail in FIG. 4.

The lighting unit 104 comprises a housing 106 being generally cylindrical and having an index formation 108 projecting therefrom. The housing 106 comprises: (i) a plug 110 projecting from the rear thereof for engagement with a sockets of the aircraft power system (not shown), (ii) a lighting controller (not visible), and (iii) an LED lamp array 112. The LED lamp array 112 is controlled by the electrical controller to perform according to specification (for example, to strobe at a certain frequency if the lamp 104 is a navigational light).

A glazing unit 114 is installed into the winglet 102. The glazing unit comprises an upper surface 116, a lower surface 118 and is generally v-shaped in a line of flight direction.

The glazing unit 114 comprises a series of reflecting and/or refracting surfaces contained therein in order to ensure that the light emitted from the LED array is projected in a line of flight direction.

Figure 5:
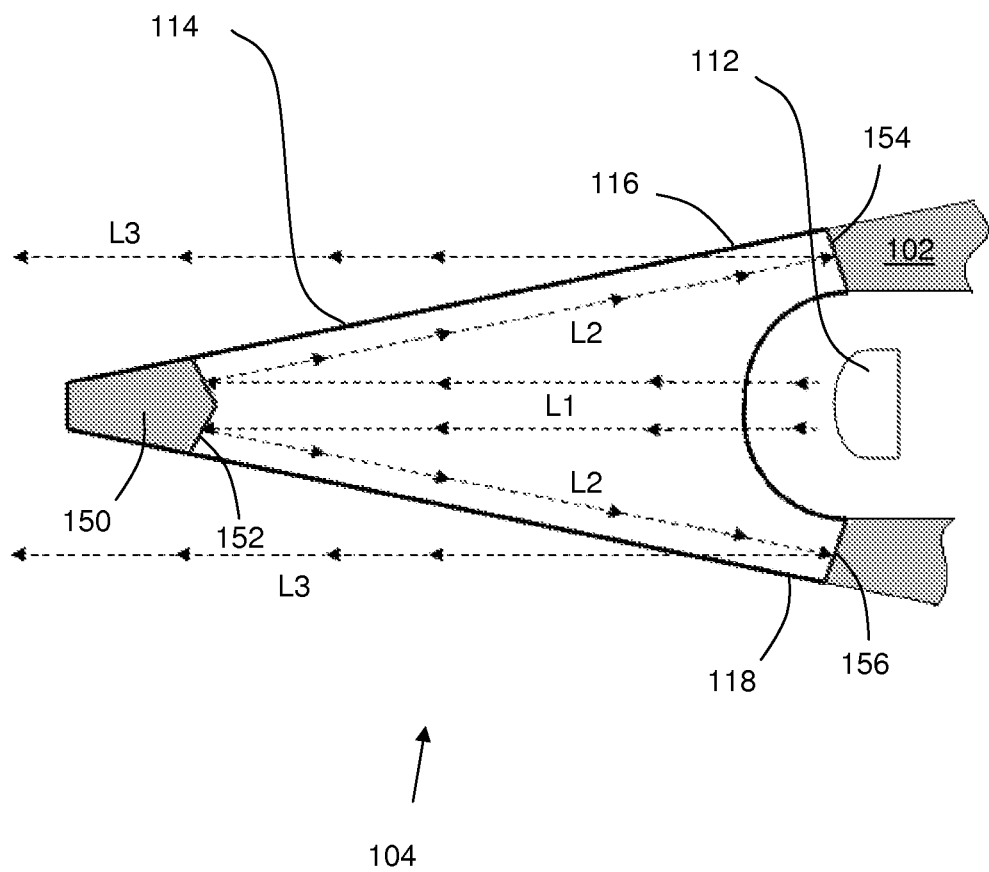

Turning to FIG. 5, the unit 114 is shown in section. Light L1 is emitted from the LEDs 112 towards a tip reflector 150 which is reflective on its LED facing surface 152. The surface 150 is convex (facing the LED 112) and n this instance is shaped as a "V". The light L1 is then reflected back along L2 to an upper root reflector 154 and a lower root reflector 156 positioned on either side of the LED 112. The root reflectors are oriented to reflect the incident light L2 back in the direction of the emitted light L1 along L3.

The arrangement is beneficial because the tip of the unit 114 can act as a prism, refracting and distorting the light L1. Therefore its internal reflection within the unit 114 permits the light to propagate substantially unaffected.

It will also be noted that the glazing unit 114 has surfaces 116, 118 which conform to the profile of the upper and lower surfaces 96, 98 of the winglet 102.

As such, the glazing unit 114 forms an integral part of the winglet structure.

The housing 106 is installable within the winglet 102 such that the plug 110 engages in an appropriate power socket. This connection may be via snap-fit, bayonet fit or spring loaded connection such that the housing 106 can be easily removed following removal of the glazing unit 104. As such, it will be appreciated that the glazing unit 114 is also removably mounted into the winglet 102. The index formation 108 engages a complementary female formation in the wing to ensure correct orientation.

It is envisaged that the glazing unit 114 can be integral with the housing 106 or permanently attached thereto. It is more likely that either the glazing unit 114 or the lighting systems contained within the housing 106 would require replacement independently of the other and, as such, these two components are independently removable such that one can be replaced whilst retaining the other.

In addition to the above described features, it is envisaged that the lighting system may have a heat sink in order to conduct heat energy away from the LED lamps so that they do not overheat.

The housing 106 is surrounded by an elastomeric sheath in order to prevent shock loading on the LED unit 112. This also mitigates any damage during insertion or removal during service.

It is envisaged that the glazing unit 114 will be sealed where it joins the winglet 102 in order to prevent any moisture from entering and damaging the circuitry within the lighting unit. A glazing unit may comprise a recess in which to receive part of the LED array 112.

The invention claimed is:

1. An aircraft wing comprising:
   a lighting unit module comprising a housing, the housing containing:
   a lamp, and;
   an electrical controller, which electrical controller is configured to control illumination of the lamp,
   the module further comprising a glazing member covering the lamp and having an outer surface which conforms to the profile of the aircraft wing.

2. An aircraft wing according to claim 1 in which the glazing member defines the leading/trailing edge of the wing.

3. An aircraft wing according to claim 2 in which the gazing member defines part of the top and bottom surfaces of the wing.

4. An aircraft wing according to claim 1 in which the modular lighting unit is removably mounted in the wing.

5. An aircraft wing, comprising:
   a lighting unit module comprising a housing, the housing containing:
   a lamp, and;
   an electrical controller, which electrical controller is configured to control illumination of the lamp,
   the module further comprising a glazing member covering the lamp and having an outer surface which conforms to the profile of the aircraft wing;
   wherein the modular lighting unit is removably mounted in the wing, and in which the modular lighting unit is installable in the wing via a plug and socket connection.

6. An aircraft wing according to claim 4 in which the modular lighting unit is snap-fitted into the wing.

7. An aircraft wing according to claim 4 in which the modular lighting unit is bayonet-fitted into the wing.

8. An aircraft wing comprising:
   a lighting unit module comprising a housing, the housing containing:
   a lamp, and;
   an electrical controller, which electrical controller is configured to control illumination of the lamp,
   the module further comprising a glazing member covering the lamp and having an outer surface which conforms to the profile of the aircraft wing, in which the housing comprises a cylindrical surface engageable with a cylindrical female formation in the wing.

9. An aircraft wing according to claim 8 in which the housing and the female formation comprise complementary index formations.

10. An aircraft wing according to claim 1 in which the glazing member is configured to project illumination from the lamp parallel to the wing direction of flight.

11. An aircraft wing, comprising:
    a lighting unit module comprising a housing, the housing containing:
    a lamp, and;
    an electrical controller, which electrical controller is configured to control illumination of the lamp,
    the module further comprising a glazing member covering the lamp and having an outer surface which conforms to the profile of the aircraft wing.
    in which the glazing member is configured to project illumination from the lamp parallel to the wing direction of flight, and
    in which the glazing member comprises light refracting or reflecting means.

12. An aircraft wing according to claim 11 in which the light refracting or reflecting means is a prism.

13. An aircraft wing, comprising:
    a lighting unit module comprising a housing, the housing containing:
    a lamp, and;
    an electrical controller, which electrical controller is configured to control illumination of the lamp,
    the module further comprising a glazing member covering the lamp and having an outer surface which conforms to the profile of the aircraft wing; and,
    a resilient member disposed between the lamp housing and the wing.

14. An aircraft wing according to claim 13 in which the resilient member is an elastomeric sheath.

* * * * *